United States Patent
Xu et al.

(10) Patent No.: US 11,825,810 B2
(45) Date of Patent: Nov. 28, 2023

(54) INTELLIGENT AUTOMATIC LIVESTOCK REARING SYSTEM

(71) Applicant: Energy Americas, LLC, Boonville, MO (US)

(72) Inventors: Yunsheng Xu, Columbia, MO (US); Tingsheng Xu, Columbia, MO (US); Ziteng Xu, Columbia, MO (US)

(73) Assignee: ENERGY AMERICAS, LLC, Boonville, MO (US)

( * ) Notice: Subject to any disclaimer, the term of this patent is extended or adjusted under 35 U.S.C. 154(b) by 124 days.

(21) Appl. No.: 17/018,584

(22) Filed: Sep. 11, 2020

(65) Prior Publication Data
US 2021/0076634 A1    Mar. 18, 2021

(30) Foreign Application Priority Data

Sep. 12, 2019 (CN) .......................... 201910865475.X
Sep. 25, 2019 (CN) .......................... 201910913989.8

(51) Int. Cl.
 *A01K 1/01* (2006.01)
 *B25J 11/00* (2006.01)
 *B25J 13/08* (2006.01)

(52) U.S. Cl.
 CPC .......... *A01K 1/0128* (2013.01); *A01K 1/0135* (2013.01); *B25J 11/0085* (2013.01); *B25J 13/087* (2013.01)

(58) Field of Classification Search
 CPC . A01K 1/0128; A01K 1/0135; B25J 11/0085; B25J 13/087
 See application file for complete search history.

(56) References Cited

U.S. PATENT DOCUMENTS 3,860,109 A * 1/1975 Benzmiller .......... A01K 1/0132
                                                 242/364.11
4,520,759 A * 6/1985 Deters ...................... B28B 7/08
                                                      119/527
(Continued)

FOREIGN PATENT DOCUMENTS

CN     108967252 A    12/2018
DE     10124775 C1 *  7/2002   .......... A01K 1/0132
(Continued)

OTHER PUBLICATIONS

Translation of WO-2017179971-A1 (Year: 2017).*
International Search Report for corresponding application PCT/US2020/050312 dated Dec. 1, 2020.

*Primary Examiner* — Monica L Perry
*Assistant Examiner* — Brittany A Lowery
(74) *Attorney, Agent, or Firm* — Sanberg Phoenix & von Gontard PC

(57) ABSTRACT

A livestock automatic rearing system, including a supporting frame, grooved floor panels, an operating robot, horizontal and longitudinal conveyors. Animals are reared on grooved panels with feces hold in the grooves. The operating robot is programmed to remove feces, clean up floor panels, pick up dead or sick animals and bring all these objects out of the building through a conveyor system. The autonomous operating robot also assists young animal placement, finished animal, and final cleaning and disinfection. With sensors and AI system, the robot provides behavior observation, health diagnosis, early warning, and remote medical treatment. An underfloor environment control system provides better and comforts air with reduced energy. The system will help reduce farmer's labor in an unpleasant environment, improve animal welfare, increate production effectiveness, and reduce biosecurity risk through the elimination contact of humans with animals.

17 Claims, 6 Drawing Sheets

(56) References Cited

U.S. PATENT DOCUMENTS

| | | | |
|---|---|---|---|
| 6,923,145 B2* | 8/2005 | Wahl | A01K 1/0151 |
| | | | 119/530 |
| 10,870,958 B2* | 12/2020 | Fornarotto | A01K 1/01 |
| 2011/0146582 A1* | 6/2011 | Lemmon | F24F 11/56 |
| | | | 454/258 |
| 2015/0223429 A1 | 8/2015 | Van Adrichem et al. | |
| 2017/0215371 A1* | 8/2017 | Fransen | A01K 1/0155 |
| 2018/0332815 A1* | 11/2018 | Hajda | A01K 1/0128 |
| 2018/0360002 A1* | 12/2018 | Planquette | A01K 31/04 |
| 2019/0166788 A1* | 6/2019 | Xu | A01K 1/0128 |

FOREIGN PATENT DOCUMENTS

| | | | | |
|---|---|---|---|---|
| EP | 0749684 A1 | * | 12/1996 | A01K 1/015 |
| KR | 101157787 B1 | * | 8/2011 | |
| KR | 20120041828 A | * | 5/2012 | |
| KR | 101157787 B1 | * | 6/2012 | |
| KR | 101157787 B2 | | 6/2012 | |

* cited by examiner

INTELLIGENT AUTOMATIC LIVESTOCK REARING SYSTEM

CROSS-REFERENCE TO RELATED APPLICATIONS

This application claims the benefit, under 35 U.S.C. § 119, of Chinese Application CN201910865475.X, filed Sep. 12, 2019 and Chinese Application CN201910913989.8 filed Sep. 25, 2020. The disclosure of the above application is incorporated herein by reference in its/their entirety.

FIELD

The present invention relates to poultry growing, and more specifically, to an intelligent automatic rearing system for aiding in the operation of poultry barns.

BACKGROUND

The statements in this section merely provide background information related to the present disclosure and may not constitute prior art.

In the past several decades poultry growing, also referred to herein as poultry farming, has evolved from family oriented small-scale natural growing to large scale industrial production. Poultry farming has become a specialized or full-time job.

Commonly used rearing system for poultry production includes cage rearing, floor rearing and slat rearing.

Cage rearing is the growing of poultry in a limited space of mesh cage, which is often high density with multiple layers. This method has been criticized for its poor performance in animal welfare.

Floor rearing is growing birds in a large space. The production cost for each bird is high in comparison with the multilayer of cage rearing. Bedding materials are required on the ground during the growing period. The commonly used bedding materials include shaving, wood chips, sawdust, grain shells, broken wheat rods or straw rods. Because the bedding materials cannot be removed during the growing period, the bedding layer, gradually soaked with wet feces, will likely cause footpad infection. It is always a challenge to control indoor humidity caused by wet floors and manage related bacteria issues. At the same time, the feces mixed into the bedding material increases the concentration of ammonia in the house, which is a potential threat to the birds' eyes and respiration system.

With the slat rearing system, birds are raised off the ground on either rigid mesh panels or flexible net surfaces. Slat rearing also requires large space since only a single floor is possible. Feces is dropped to the ground through the mesh holes, thus avoiding direct contact between the footpad and feces of the birds. The feces are either retained on the ground until the end of the growing period, or are removed out of the building via a conveyor or scamper. Production performance on slat rearing has been approved to be significantly better in average weight, feed conversion rate, and footpad health, while the disadvantages have been seen as a high initial investment on slat material and installation, and the following cleaning of slat panels and treatment of wastewater.

SUMMARY

Regarding existing issues in livestock farming, this invention, with the robotic system and rearing structure, offers a new automatic livestock rearing system to overcome the above-mentioned problems and partially or completely replace manual work in growing.

In various embodiments, the present disclosure provides a poultry rearing system with a robot for the operation. The system consists of the following components: supporting-frame, floor panels set on the frame, horizontal and vertical (latitudinal and longitudinal) conveyors.

In various embodiments, the floor panel is non-porous or micro-penetrating grooved plates, with the upper surface of which has grooves for holding feces;

In various embodiments, the lateral conveyor and the vertical conveyor are perpendicular to each other or set at a first preset angle, and one end of the lateral conveyor is on top of the vertical conveyor belt.

In various embodiments, the lateral conveyor is attached to an operating robot which moves along the vertical conveyor belt.

In various embodiments, the operating robot comprises a cleaning component for cleaning floor panels and removing feces.

In various embodiments, the cleaning component comprises a toothed shovel suitable for the grooved upper surface of the floor panel. The front end of the tooth shovel extends into the groove of the floor panel, the rear of the tooth shovel is directly or indirectly adjacent to the lateral conveyor, and the feces from the tooth shovel is dumped on the lateral conveyor belt.

In various embodiments, the cleaning component also comprises a rotary roller brush, the length direction of the rotary roller brush, and the moving direction of the robot are set at a second preset angle.

In various embodiments, the front of the robot is equipped with an up-hill pushing device to move birds across the robot. A bird pushing device is a drum-driven conveyor belt or an upward shift device formed by a reciprocating eccentric device.

In various embodiments, grooved panels are serially connected to form a straight track (bird-growing floor). Two parallel tracks are connected at the end by a 180-degree arc section to form a track loop. The operating robot is set to moving on top of the track loop.

In various embodiments, the operating robot is provided with a dust suction and a vacuum vacuuming device.

In various embodiments, the operating robot also has a mounted platform for carrying staff and other peripheral equipment.

In various embodiments, the operating robot also comprises the washing components for soaking, high-pressure cleaning, and disinfection. The washing component comprises a water pipe, a liquid container connected to a source, a liquid pump, and multiple nozzles set in the direction of the length of the operating robot.

In various embodiments, a mesh pedal with characteristic dimensions of the mesh hole being smaller than the animal's foot and allows feces and debris to pass through, the pedal is provided with an axis that flips along its long edge.

In various embodiments, the operating robot also includes a footpad cleaning device and a health diagnostic device. The foot cleaning device and the health diagnostic device comprise an infrared thermal sensor and an image sensor. The foot cleaning device and the health diagnostic device are installed under the pedal.

In various embodiments, the lateral conveyor and the vertical conveyor are hosted in a U-shape slot, which is leak-free.

In various embodiments, the system also includes an underfloor environmental control component. The underfloor environmental control component comprises a sidewall of the shed, air inlet, air outlet, air-inlet fan, and/or air-outlet fan. The growing floor with grooved panels is suspended by supporting frames at a preset height. The suspended floor, the sidewall of the shed, and the ground form an enclosed space for fresh air flowing inside.

In various embodiments, on the floor panels or along the edge of the floor panels, there are openings for fresh air, conditioned or unconditioned, to flow through from underneath to above open space through.

In various embodiments, the underfloor environmental control components also include the heating device, cooling device, and waste heat recovery device;

The heating device is a heater which heats fresh air to the required temperature and blows the heated fresh air to indoor space through underfloor space. The heating device can be a direct air heater or a combination of a water heater with a water-to-air heat exchanger.

The cooling device is used to cool the air and blow the cooled air to the indoor space through underfloor space. The cooling device can be an evaporating cooling-cell or a misting system with multiple nozzles;

The ventilation device consists of fans to deliver fresh air into the shed. The ventilation device can work with or without a heating or cooling device.

The waste heat recovery device consists of inlet and outlet fans, and a heat exchanger to transfer heat from two air streams.

In various embodiments, the rearing system can be duplicated in the direction of horizontal and vertical, that is, a shed can be divided into multiple zones, each zone independently placed with a vertical conveyor, each zone is covered with grooved panels. Multiple zones can share an operating robot or serve by multiple robots.

In various embodiments, the system is superimposed vertically to form a multi-layer growing space, the upper level growing space can be the entire area of the shed or part of the shed area.

The invention discloses a livestock automatic rearing system. The system consists of the grooved panel floor, the supporting frame, the operating robot, and the transfer conveyor. The grooved panel floor is designed to accommodate animal feces and avoid direct contact of animal footpad and feces. The operating robot conducts regular floor cleaning, maintains indoor hygiene and air quality to eliminate Footpad Dermatitis (FPD). The operating robot, with the conveyor devices, also collect dead birds and remove them out of the shed. At the end of growing the flock, the operating robot and conveyor devices collect all the birds and deliver the birds out of the shed.

The invention also discloses underfloor heating, cooling, and ventilation systems based on the suspended panel floor. The conditioned or un-conditioned fresh air is introduced into the enclosed space underneath the panel floor and distributed to the entire growing space. It will provide comfort to the animal's body, rather than wasting the comforting air in an open space above the animal.

The embodiments of the rearing system proposed by this invention include the following advantages:

The system provides a good living environment for animals, minimizes the risk of feces caused animal footpad infection, reduces indoor ammonia levels, releases animal pressure, and improves animal weight, mortality, and feed conversion rate.

The system eliminates the use of bedding materials, and saves the cost of the material and related transportation, storage, spraying costs.

The system reduces or replaces farmer's daily work, including removing feces, cleaning the floor, collecting sick and dead birds. It also assists in the early stage of bird placement, feed preparation, vaccination, and bird harvesting out of the shed at the end of growing. After removal of the birds, the system conducts subsequent shed deep cleaning and greatly reduces working time in the harsh environment. At the same time, the system reduces the contact of people with any animal to benefit biosecurity;

Efficient automatic cleaning is conducive to reducing the consumption of water resources, wastewater is fully collected without leaking for treatment and possibly recycling.

The underfloor ventilation and environmental control system proposed in various embodiments of the present invention can cool or heat fresh air, and evenly deliver the conditioned air to the full shed floor through the underneath space, thus ensuring the comfort is focused at animal height. Uniformity of comfort in the whole floor space of the shed avoids the accumulation and squeezing of birds. A separate fence to limit birds moving becomes unnecessary.

The underfloor environmental control system, including waste heat recovery components, significantly reduces energy costs for winter heating, summer cooling, and year-round ventilation. Efficient heating, cooling, and ventilation systems also ensure the safety of animals in extreme climates and help with the animals' welfare in extreme climates;

Based on the above, the present invention can be used to support the production of healthy proteins in the birds and to produce highly healthy, antibiotic-free animals.

DRAWINGS

FIG. 1 is a diagram of an automatic rearing system, in accordance with various embodiments of the present disclosure.

FIG. 2, with drawings of A and B, are diagrams of grooved panels of the rearing system, in accordance with various embodiments of the present disclosure.

DETAILED DESCRIPTION

Figure 1:
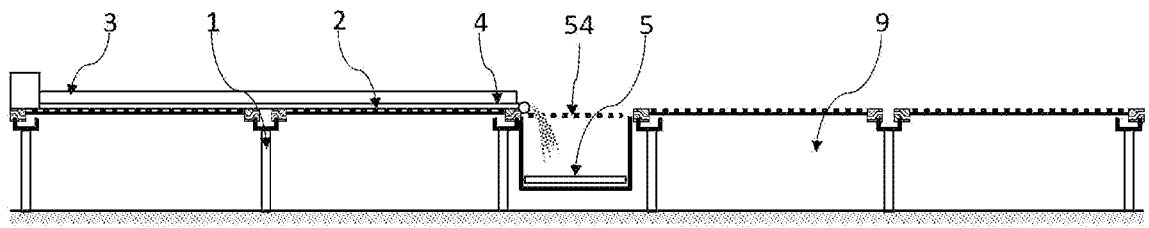

The following description is merely exemplary in nature and is in no way intended to limit the present teachings, application, or uses. Throughout this specification, like reference numerals will be used to refer to like elements. Additionally, the embodiments disclosed below are not intended to be exhaustive or to limit the invention to the precise forms disclosed in the following detailed description. Rather, the embodiments are chosen and described so that others skilled in the art can utilize their teachings. As well, it should be understood that the drawings are intended to illustrate and plainly disclose presently envisioned embodiments to one of skill in the art, but are not intended to be manufacturing level drawings or renditions of final products and may include simplified conceptual views to facilitate understanding or explanation. As well, the relative size and arrangement of the components may differ from that shown and still operate within the spirit of the invention.

As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims.

Unless otherwise defined, all technical and scientific terms used herein have the same meaning as commonly understood by one of ordinary skill in the art to which this disclosure belongs. The terminology used herein is for the purpose of describing particular example embodiments only and is not intended to be limiting. As used herein, the singular forms "a", "an", and "the" may be intended to include the plural forms as well, unless the context clearly indicates otherwise. The terms "comprises", "comprising", "including", and "having" are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps can be employed.

When an element, object, device, apparatus, component, region or section, etc., is referred to as being "on", "engaged to or with", "connected to or with", or "coupled to or with" another element, object, device, apparatus, component, region or section, etc., it can be directly on, engaged, connected or coupled to or with the other element, object, device, apparatus, component, region or section, etc., or intervening elements, objects, devices, apparatuses, components, regions or sections, etc., can be present. In contrast, when an element, object, device, apparatus, component, region or section, etc., is referred to as being "directly on", "directly engaged to", "directly connected to", or "directly coupled to" another element, object, device, apparatus, component, region or section, etc., there may be no intervening elements, objects, devices, apparatuses, components, regions or sections, etc., present. Other words used to describe the relationship between elements, objects, devices, apparatuses, components, regions or sections, etc., should be interpreted in a like fashion (e.g., "between" versus "directly between", "adjacent" versus "directly adjacent", etc.).

As used herein the phrase "operably connected to" will be understood to mean two are more elements, objects, devices, apparatuses, components, etc., that are directly or indirectly connected to each other in an operational and/or cooperative manner such that operation or function of at least one of the elements, objects, devices, apparatuses, components, etc., imparts are causes operation or function of at least one other of the elements, objects, devices, apparatuses, components, etc. Such imparting or causing of operation or function can be unilateral or bilateral.

As used herein, the term "and/or" includes any and all combinations of one or more of the associated listed items. For example, A and/or B includes A alone, or B alone, or both A and B.

Although the terms first, second, third, etc. can be used herein to describe various elements, objects, devices, apparatuses, components, regions or sections, etc., these elements, objects, devices, apparatuses, components, regions or sections, etc., should not be limited by these terms. These terms may be used only to distinguish one element, object, device, apparatus, component, region or section, etc., from another element, object, device, apparatus, component, region or section, etc., and do not necessarily imply a sequence or order unless clearly indicated by the context.

Moreover, it will be understood that various directions such as "upper", "lower", "bottom", "top", "left", "right", "first", "second" and so forth are made only with respect to explanation in conjunction with the drawings, and that components may be oriented differently, for instance, during transportation and manufacturing as well as operation. Because many varying and different embodiments may be made within the scope of the concept(s) taught herein, and because many modifications may be made in the embodiments described herein, it is to be understood that the details herein are to be interpreted as illustrative and non-limiting.

With drawings and specific embodiments, features and advantages of the present invention are further explained in detail. All of the "panel floors" mentioned above and hereafter will be understood to mean the grooved panel as a growing floor.

Referring now to FIG. 1, FIG. 1 shows the structure diagram of an automatic livestock rearing system 10, in accordance with various embodiments of the present disclosure. Generally, the system includes: a supporting frame 1, a multiple grooved panel floor 2 setting on supporting frame 1, an operating robot 3 walking on top of panel floor 2, a horizontal or lateral conveyor 4, and a vertical or longitudinal conveyor 5. The horizontal/lateral conveyor 4 and the vertical/longitudinal conveyor 5 both lay in planes substantially parallel to the ground 93 are, in various instances substantially perpendicular to each other, or in other instances lie at an angle with respect to each other, one end of the lateral conveyor 4 is disposed in close proximity to the longitudinal conveyor 5, such that objects such as feces, dead birds, living birds, and wastewater on the lateral conveyor 4 are guaranteed to be placed on the longitudinal conveyor 5 in variety of processing phases.

As one of the optional examples of various embodiments, the supporting frame 1 includes a supporting post, which can be secured directly to the ground. Optionally, multiple supporting posts can be set as a matrix according to a certain interval between each other. Interval and quantity of supporting posts can be set according to the size and strength of grooved panel 2, the size of the shed, and the weight of animals. Frame 1 supports the floor panel 2 to a certain height, forming an enclosed space 9 under the floor panels. Enclosed space 9 is the basis of the underfloor environment control components described later.

In FIG. 1, the floor panels 2 can be connected in series and/or in parallel to form a rearing slab. The longitudinal conveyor 5 is arranged between at least two of the rearing slabs. The rearing slabs, with the longitudinal conveyor 5 in the center forms a rearing zone, one shed can be configured to include one or multiple rearing zones.

In different processing phases, the operating robot 3 sweeps out the feces and cleans the floor panels 2, collects dead or sick birds, drives out the matured chickens, and collects the wastewater. All these objects, feces, dead/sick birds, living matured birds, and wastewater will be placed on the lateral conveyor 4, and then is moved to one side of the robot 3 by movement of lateral conveyor 4, and then dumped on the longitudinal conveyor 5. Conveyor 5 then transported all these objects out of the shed under the action of the longitudinal conveyor 5.

Figure 2:
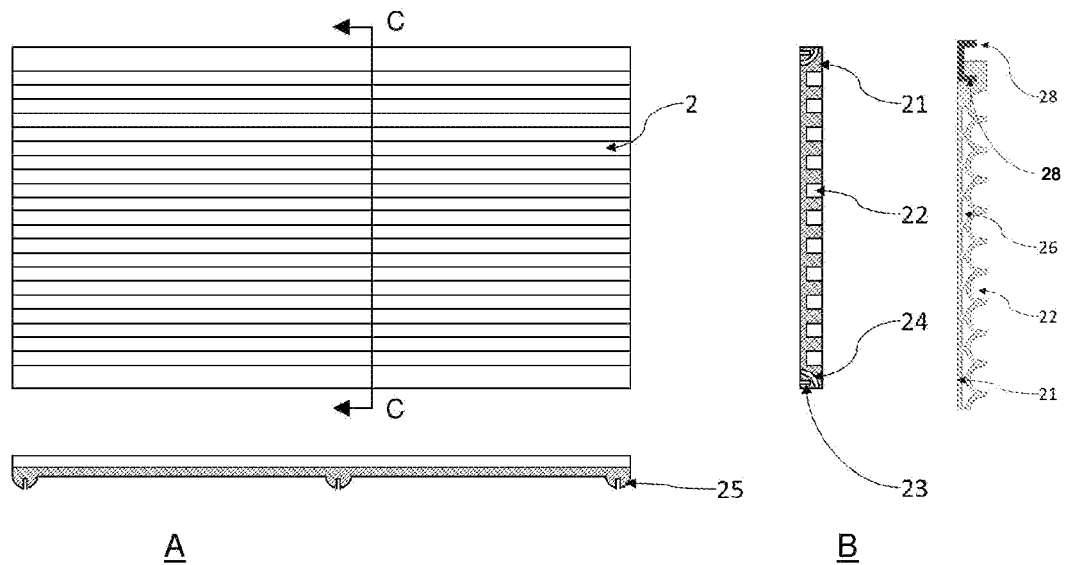

FIG. 2, with drawings of A and B, are diagrams of the grooved panels 2 as two exemplary embodiments of the present disclosure. The drawing shows the diagram of the floor panel. FIG. 2A is the top view and a front view of the floor panels 2, and FIG. 2B is a side view. It is important the floor panels 2 be constructed such the feces and other debris will not be allowed to pass therethrough and will remain on top of the floor panels 2 where the robot can clean the floor panels 2 (i.e., remove the feces and other debris) as described herein. In various embodiments, the floor panel 2 can comprise grooved solid, or non-porous, or non-penetrated plates or panels, or various other embodiments, micro-porous or micro-penetrating plates or panels. The floor panel 2 can be made of any suitable material such as metal, polymer, concrete, or any other material(s). The floor panel grooves can be engraved directly on the finished concrete floor, or shaped while the concrete floor is poured. Particularly, in various instances the floor panels 2 can non-porous such that that air cannot pass through the floor panels 2, or in other instances the floor panels 2 can be microporous such that air can pass through the panels 2. In the micro-porous instances allowing air to pass through won't be a problem because, as described below, the space below the floor panels 2 is positively pressured. Therefore, the feces and other debris will not be allowed to pass therethrough and will remain on top of the floor panels 2 where the robot can clean the floor panels 2 (i.e., remove the feces and other debris) as described herein.

Referring to FIG. 2, on the upper side of a main plate body 21, square grooves 22 are designed to hold feces. The characteristic size of grooves 22 can be set to be similar to the footpad size of the farmed animal, slightly smaller than the footpad of chicken if used for poultry growing. The depth of groove 22 can be set according to the amount of feces the birds produce during the interval of cleaning cycles. The direction of grooves 22 can be set up straight or curved to the direction of the robot walking. Groove 22 can also be continuous or interrupted. In various embodiments, grooved faces are engraved on the top surface of the plate 21. The animals can be free to sit or walk on the floor panel 2. At the edge of the panel 2, a lock trench 23 on the backside of the panel is designed for connection of two neighbor panels through a U-type locker (connector).

Referring to FIG. 2B, in various embodiments, the engraved trenches 22 on the floor panel 2 are rounded for easier removal of feces and cleaning of trenches. To save panel material and enhance the strength of the panel, a hollow panel can be implemented with multiple holes 26 inside the panel. At the edge of the floor panel, a lock trench 23 is designed for the connection of two neighbor panel through a U-type locker (connector) 28.

Referring to FIG. 2, in various embodiments, on the edge of the floor panel 2, air-flow holes 24 can be used for airflow from underneath space to upper space. On the back of floor panel 2, hamstring rib 25 is designed to reinforce the panel 2. If necessary, an additional enhancement piece made of metal or high-strength material can be inserted into the slot along the reinforcement rib 25.

Figure 3:
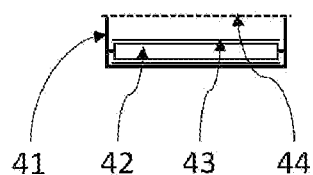
FIG. 3 is a diagram of a conveying device of the rearing, in accordance with various embodiments of the present disclosure.
Figure 4:
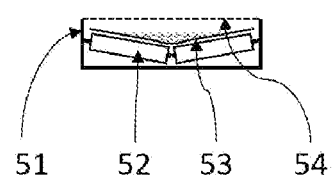
FIG. 4 is a diagram of the conveying device, in accordance with various other embodiments of the present disclosure.

FIGS. 3 and 4 show the schematics of the horizontal and longitudinal conveyors.

As shown in FIG. 3, the conveyor in this embodiment uses a flexible conveyor belt 43 driven by roller 42. Flexible conveyor belt 43 placed in the U-type slot 41 with the upper side open. As a result, feces, wastewater, feather, and other debris will be contained in the slot without entering the lower space. The U-shape slot 41 is covered with mesh 44 or a perforated plate with openings. The characteristic size of the mesh or plate holes is smaller than the animal footpad or hoof, but allow feces to pass through the mesh hole. The cover plate 44 has hinges along the long-side to allow for flipping of the plate 44.

FIG. 4 shows another embodiment. Supporting rollers 52 are installed on the side walls 51 of the U-shaped slot. Supporting rollers 52 are tilted downward to the center to form a lower displacement of the conveyor belt 53, to ensure that feces or wastewater can be confined to the center without outflow to the lower space. Flexible conveyor belt 53 placed in the U-type slot 51 with the upper side open. As a result, feces, wastewater, feather, and other debris will be contained in the slot without entering the lower space. The U-shape slot 51 is covered with mesh 54 or a perforated plate with openings. The characteristic size of the mesh or plate holes is smaller than the animal footpad or hoof, but allow feces to pass through the mesh hole. The cover plate 54 has hinges along the long-side to allow for flipping of the plate 54

Figure 5:
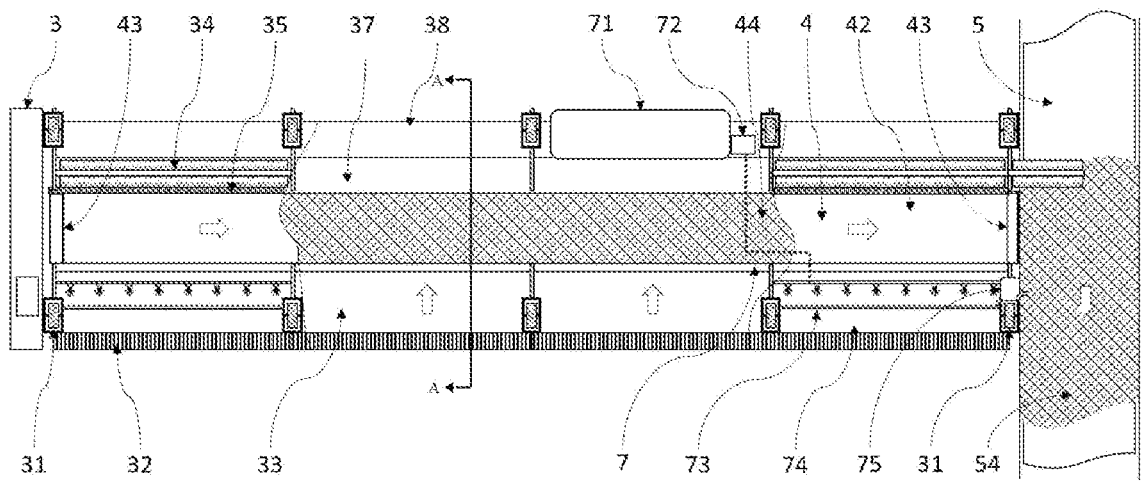
FIG. 5 is a top view diagram of an operating robot with lateral conveyor of the rearing system, in accordance with various embodiments of the present disclosure.
Figure 6:
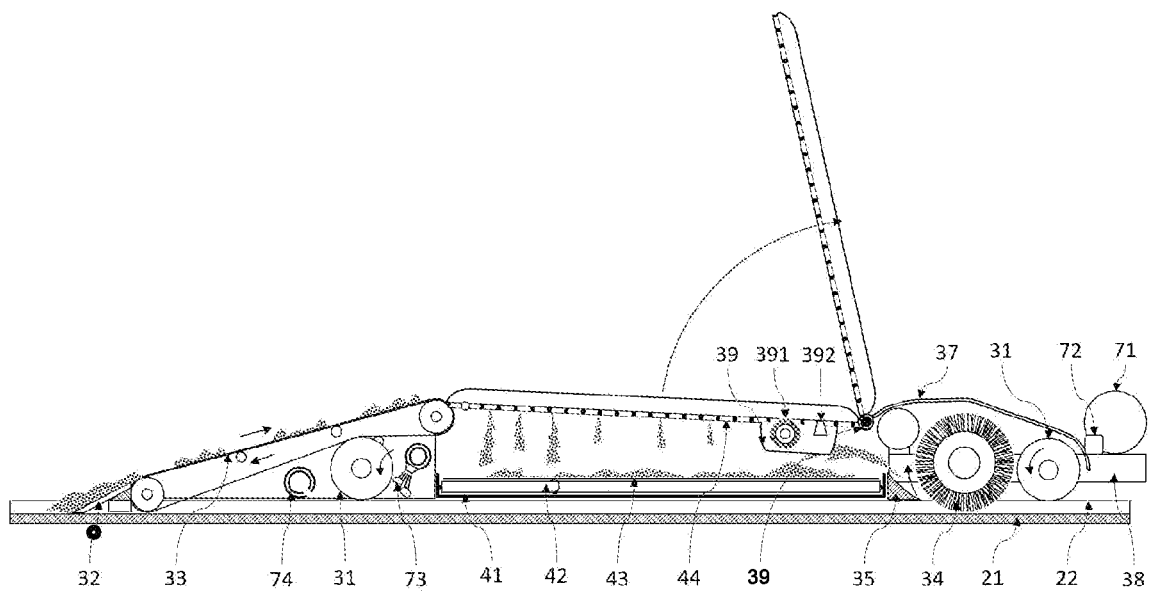
FIG. 6 is a side view diagram of the operating robot with lateral conveyor, in accordance with various embodiments of the present disclosure.

FIGS. 5 and 6 are schematics of the operating robot and conveyor system in accordance with various embodiments of the present disclosure.

FIG. 5 is a top view of the operating robot 3 and the conveyor devices, and FIG. 6 is a sectional diagram along A-A in FIG. 5. Operating robot 3 walks on top of floor panels 2 and includes a walking device 31, a front tooth shovel 32, a bird lifting device 33, a cleaning rotary brush 34, a bridge sheet 35 in front of the rotating brush 34, a vacuum suction device 36, a rear cover 37 and an attached platform 38.

The walking device 31 includes walking wheels, a driving motor, a transmission, a battery, or power plug. Only the walking wheels 31 are shown in FIG. 5.

In various embodiments, the operating robot 3, driven by walking device 31, moves along the long length direction of the longitudinal conveyor 5. The tooth shovel 32, as a pitch, shape, and depth to match with the grooves of the floor panels 2. The width of the tooth shovel 32 is slightly smaller than the width of the grooves. Tooth shovels 32 extends into the grooves of the floor panels 2 and picks or scrapes out the feces or debris from the trenches of the floor panels. The removed feces, together with birds and other waste produced by birds will be collected to mesh plate 44, through the assistance of the lifting device 33. Feces and small particles of waste will pass through the mesh plate 44 and fall onto the lateral conveyor belt 43 which is right underneath mesh plate 44. The conveyor belt 43 then transports the waste to the end of the robot next to the longitudinal conveyor 5. Living birds will pass the robot beam and drop off the robot back to the growing floor. Dead or sick birds will stay on the mesh plate 44. Mesh plate 44 will horizontally or vertically move off the central position at a designated location. Dead and sick birds will then be dumped on the lateral conveyor 4. The lateral conveyor 4 then moves dead or sick birds to the end of the robot, drop it on the cover plate 54 or longitudinal conveyor 5. Conveyor 5 will carry feces or dead birds out of the shed.

In various embodiments, the toothed shovel 32 can be flipped up and down, so that the toothed shovel 32 can be off the grooved panel while the robot is functioning for purposes other than feces cleaning.

In various embodiments, the tooth shovel 32 cleans up the feces off the floor panel 2, continued to be further cleaned by the subsequent rotating rolling brush 34. In the front of the rotating rolling brush 34, a bridging sheet 35 is placed. The rotating brush 34 brushes feces, dust, and water out of grooves of the floor panels 2 into the lateral conveyor 4. The bristle length of the rotary rolling brush 34 may match the grooves of the floor panel 2, i.e. the bristles at the groove are lengthened and deep into the grooves. Rotating brush 34 at the other end can extend to cover the mesh cover on top of the longitudinal conveyor 5.

In various embodiments, the vacuum device 36 can be installed near the rotary drum brush 34 to control dust during operation.

In various embodiments, the rotary brush 34 and other equipment are covered with the rear cover 37.

In various embodiments, the operating robot 3 is equipped with an optional platform 38. The attached platform 38 is a carrier that can accommodate one or more people for operation, service, and maintenance. Operation and service include the placement of chicks into the shed at the beginning of each flock, the placement of feed paper and feed trays in early weeks, drinking water lines and feed lines adjustment, vaccination, cleaning, and equipment maintenance.

FIGS. 5 and 6 exemplarily show how the operating robot 3 and the lateral conveyor 4 are integrated. Feces falling through the mesh plate 44, feces and dust from the rotary brush 34, or wastewater is transported by the lateral conveyor 4 to one end of the robot near the longitudinal conveyor 5 and dumped on the longitudinal conveyor 5. For the lateral conveyor 4 the flexible conveyor belt 43 is driven by the powered roller 42 at the end.

The operating robot 3 shown in FIGS. 5 and 6 also includes cleaning components for liquid cleaning and disinfection. The cleaning components of various embodiments include liquid containers 71, or a water hose to be connected with a water source, liquid pump 72, multiple nozzles 73 along the length direction of the operating robot. It also includes wastewater suction pipe 74 and wastewater circulate pump 75. The collected wastewater is transported out of the shed by the longitudinal conveyor 5.

Referring to FIG. 5 and FIG. 6, the operating robot 3 is equipped with footpad cleaning and health diagnosis diagnostic device 39. The diagnostic device 39 includes footpad cleaning device 391, diagnostic system sensor 392, such as infrared temperature and image device. The above diagnostic device 39 is placed under the mesh plate 44 or other positions. Diagnostic device 39 can be used for bird behavior monitoring, health diagnosis, health analysis, and medic treatment of birds. In various embodiments, diagnostic device 39 can also include a bacterial detector, data analyzer, telecommunication and data transfer device, alarm and medical treatment devices, etc.

The diagnostic device 39 can be used to monitor and detect the abnormal behavior and send information in real-time. Diagnosed abnormal information and alarms can be transferred to devices in the shed and remotely.

The information collected by diagnostic device 39 can be analyzed by a local and/or remotely located AI (artificially intelligent) system. AI software based on existing knowledge of animal science and self-learning can be used to improve animal production.

Figure 7:
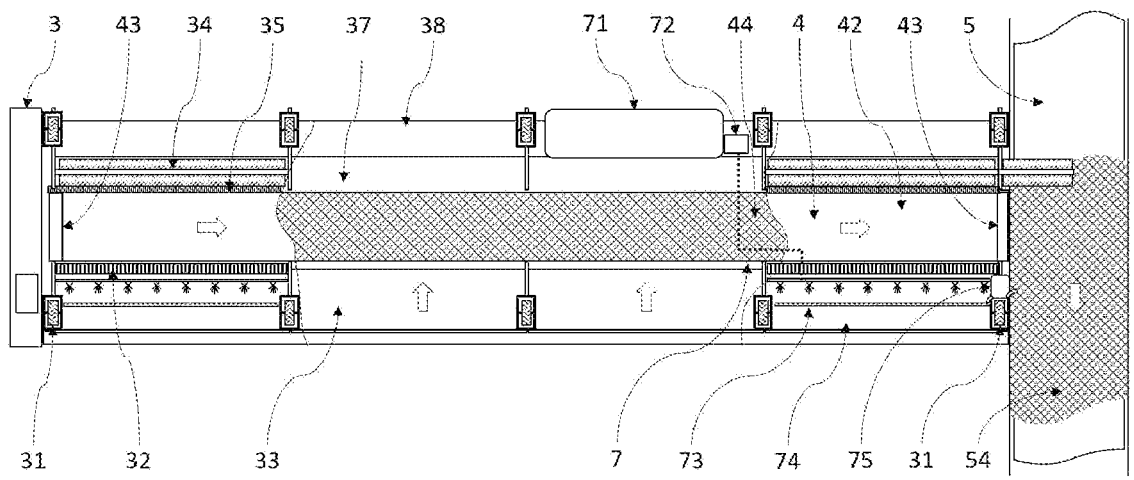
FIG. 7 is a top view diagram of the operating robot with lateral conveyor, in accordance with various embodiments of the present disclosure.
Figure 8:
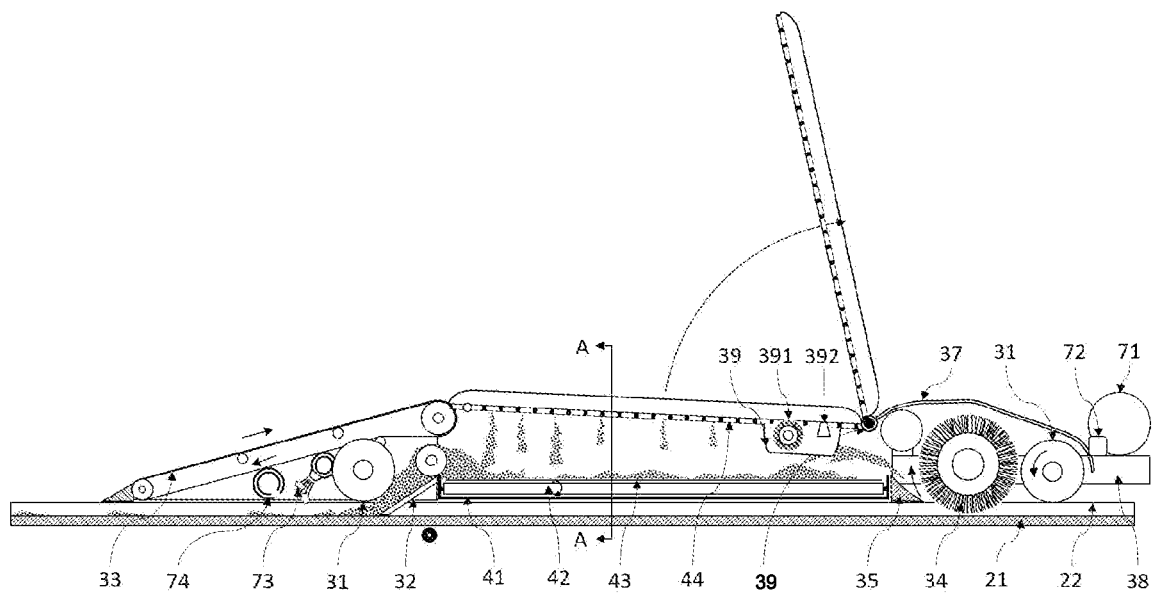
FIG. 8 is a side view diagram of the operating robot with lateral conveyor, in accordance with various embodiments of the present disclosure.

The exemplary embodiments illustrated in FIGS. 7 and 8 are similar to those illustrated in FIGS. 5 and 6. However, in various embodiments, the toothed shovel 32 is placed under the birds lifting device 33 (belt), instead of in front of it. Feces is not picked or scraped out from the grooved panel at the front location but from the front edge of the lateral conveyor 4. The lifting device 33 pushes the birds, dead or alive up to the top surface of the robot 3. Most of the feces is subsequently pick up or scraped from grooves of the floor panel right before the edge of the lateral conveyor 4. A build-up of feces at the front or lateral conveyor belt 43 can occur under the influence of natural gravity, or rotated by the roller into the lateral conveyor belt 43. This part of the feces accumulation can also be transported to one side of the robot near-longitudinal conveyor belt 5, with a chain scraper or screw auger tube. In various instances, the tooth shovel 32 can be flipped up and down, so that the robot 3 can be moved with tooth shovels out of the grooves of the floor panel 2.

The cleaning rotary brush 34, the liquid cleaning device 7, and diagnostic device 39 in such embodiments are the same as described above with regard to FIGS. 5 and 6.

Figure 9:
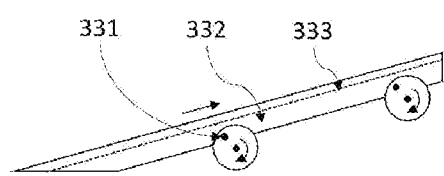
FIG. 9 is a diagram of a bird lifting conveyor of the rearing system, in accordance with various embodiments of the present disclosure.

FIG. 9 is a diagram of the birds lifting device in accordance with various embodiments of the present disclosure. A reciprocating device based on eccentric wheels (rods) can be used as an alternative to the birds lifting device 33 in the exemplary embodiments shown in FIG. 5 through FIG. 8. Eccentric wheel (rod) 331 drives the reciprocating plate 332 in a continuous rotatory motion, moves intermittent reciprocating plate 332 to the base plate 333 above, and moves back a certain distance, to achieve the animal moving upward.

Figure 10:
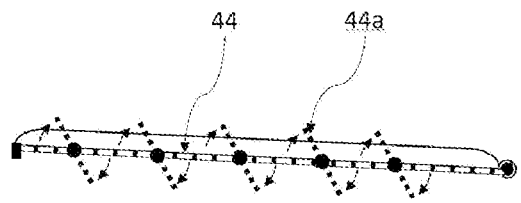
FIG. 10 is a diagram of a porous panel of the rearing system, in accordance with various embodiments of the present disclosure.

FIG. 10 is a diagram of an exemplary embodiment of the mesh plate 44 of the present invention. The mesh plate 44 or plate with holes is composed of several small segments 44a in the form of shutters, each small section 44a can be flipped when the feces accumulate.

Figure 11:
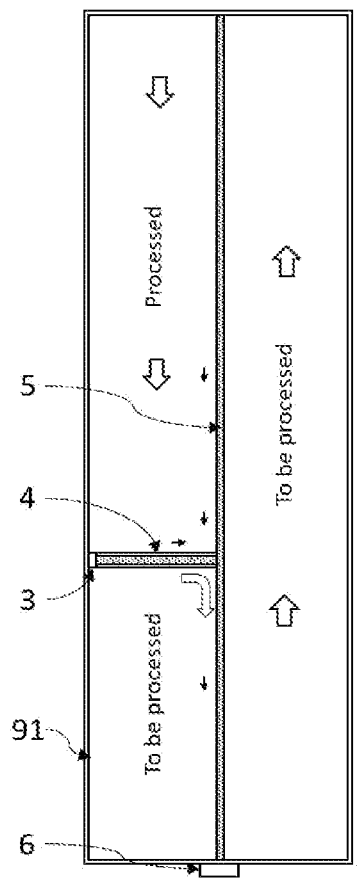
FIG. 11 is a diagram of an operating area of the robot, in accordance with various embodiments of the present disclosure.
Figure 12:
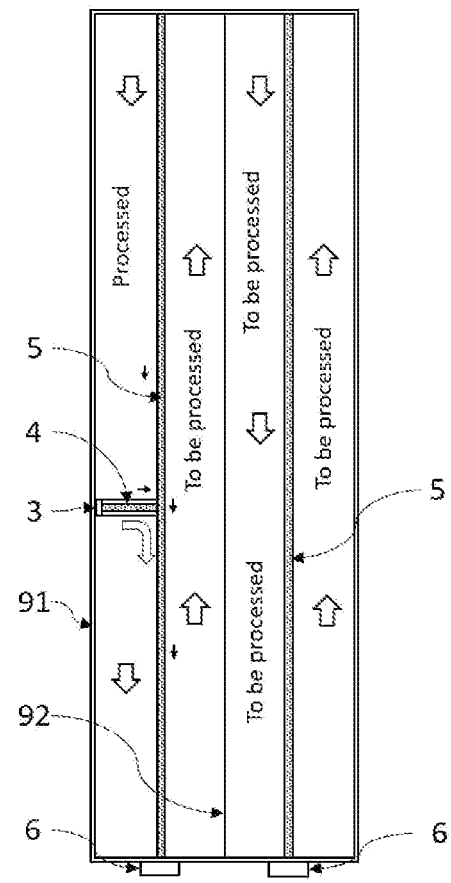
FIG. 12 is a diagram of the operating area of the robot, in accordance with various other embodiments of the present disclosure.

FIGS. 11 and 12 are exemplary diagrams showing the working area of the rearing system in accordance with various embodiments of the present disclosure.

In the exemplary embodiment shown in FIG. 11, the floor panel in the whole shed is divided into two growing tracks in the width direction, with the longitudinal conveyor 5 in the center as a separation. The longitudinal conveyor 5 is covered with a mesh or panel with holes. Birds are allowed to freely walk on it and across the two regions. A longitudinal conveyor is the carrier of the feces and dead birds out of the shed during the growing period through an opening on the shed wall. The longitudinal conveyor carries mature living birds out of the shed when the growing is finished and load the birds to bird coops 6 set outside of the shed. At the end of the flock, while all the birds have been harvested, it carries wastewater out of the shed while water cleaning is conducted. Wastewater is discharged to a water tank or sewage system. The operating robot 3 shifts from one track to another or makes 180 degrees turns.

As shown in FIG. 12, the overall shed is separated into two work areas by an isolation plate or the hanging curtain 92. In each growing area, there is two growing tracks separated by the longitudinal conveyor in the center, the same as the single area shown in FIG. 11. Each job area can share one robot, or each robot is assigned to each working area.

The longitudinal conveyor belts shown in FIGS. 11 and 12 can be either a conveyor belt as a whole or a segmented but interconnected conveyor belt. The collection container (basket) 6 can be at one end of the shed, or also be at both ends of the shed, and can also be in the center of the shed.

Figure 13:
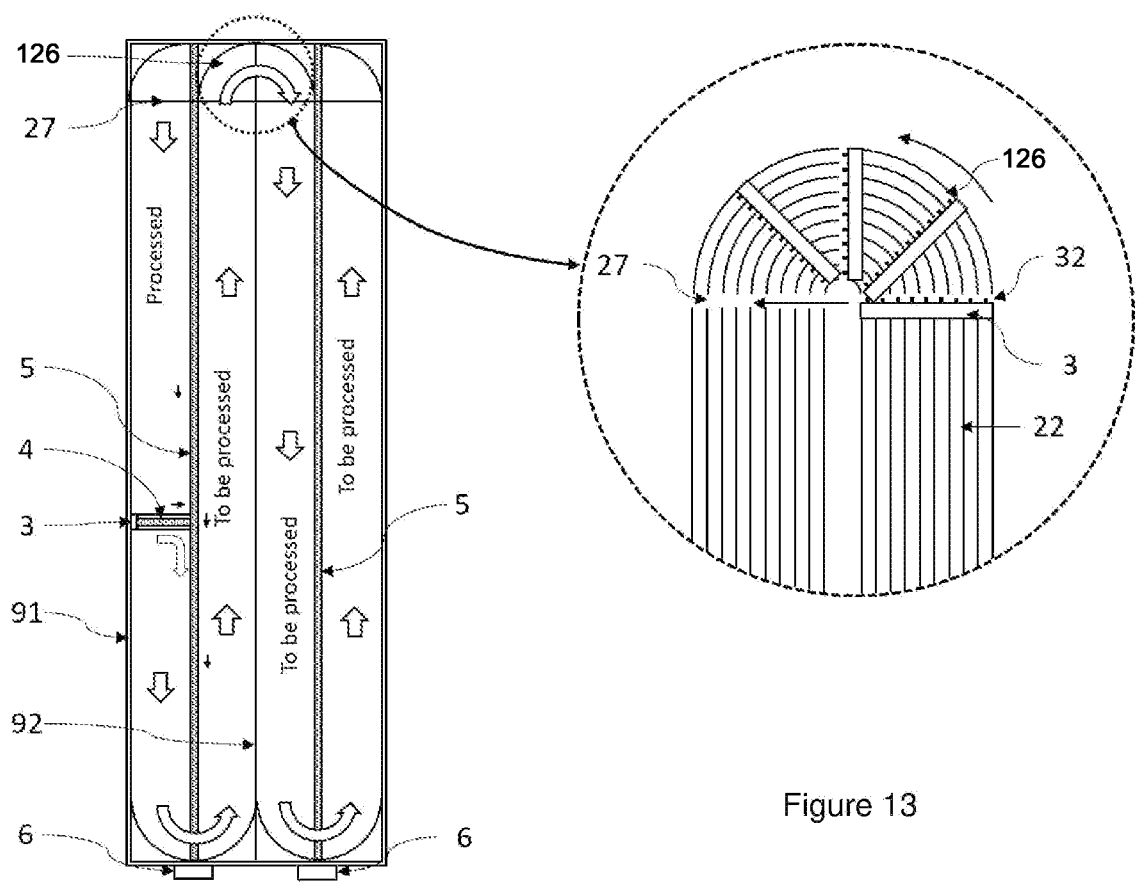
FIG. 13 is a diagram of robot movement and rotation, in accordance with various embodiments of the present disclosure.

FIG. 13 shows how the robot 3 is steered at the end of the growing track, in accordance with various embodiments of the rearing system of the present disclosure. The robot 3 and its lateral conveyor 4, when reaching the end or working tack, can lift the tooth shovel 32 to a certain height, so that the tooth shovel 32 and rolling brush 34 can be off the grooved floor panel 2, before doing the corresponding moving and rotation. In FIG. 13, floor panels with arc grooves 126 are set so that the robot 3 can do 180 degrees of rotation along the arc.

Figure 14:
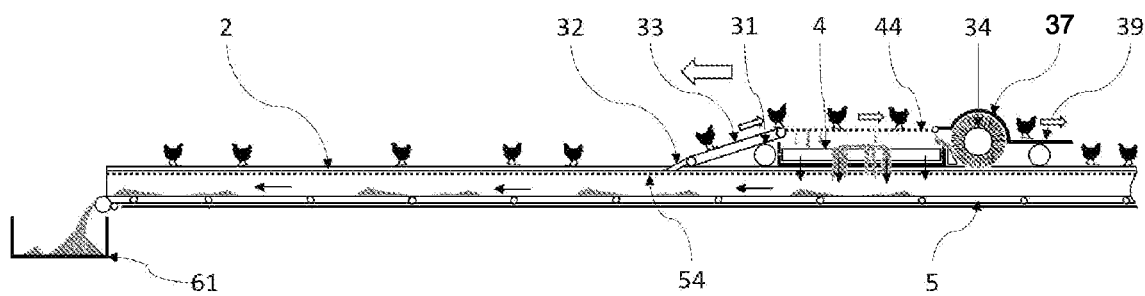
FIG. 14 is a diagram of the daily operation of the rearing system, in accordance with various embodiments of the present disclosure.

FIG. 14 is a diagram showing how the system is working in daily operation, in accordance with various embodiments of the rearing system of the present disclosure. The rearing system shown in FIG. 14 is an embodiment of the invention for poultry production. While operating robot 3 is moving toward left, the front tooth shovel 32 picks or scrapes out feces from the grooves 22 of the floor panel. Feces, dead birds, and live birds are moved toward the right with the assistance of the birds lifting device 33 and reach on the mesh plate 44, which is above the lateral conveyor 4. The living birds, being pushed by the coming birds from left, continues moving to the right, crosses the rear cover 38, back to the floor panel 2. Feces particles pass through the mesh or holes on the plate 44, fall on the lateral conveyor belt 43, and then are transported to the end by conveyor 4. The sick and dead birds are unloaded onto the lateral conveyor belt 43 while the mesh plate 44 is manually or automatically opened periodically at the designated locations. Dead or sick birds are collected daily brought to the designated positions. Longitudinal conveyor 5 eventually deliver feces and dead birds to outdoor storage bins or composting ditch 61, which further can be transported offsite for treatment.

Figure 15:
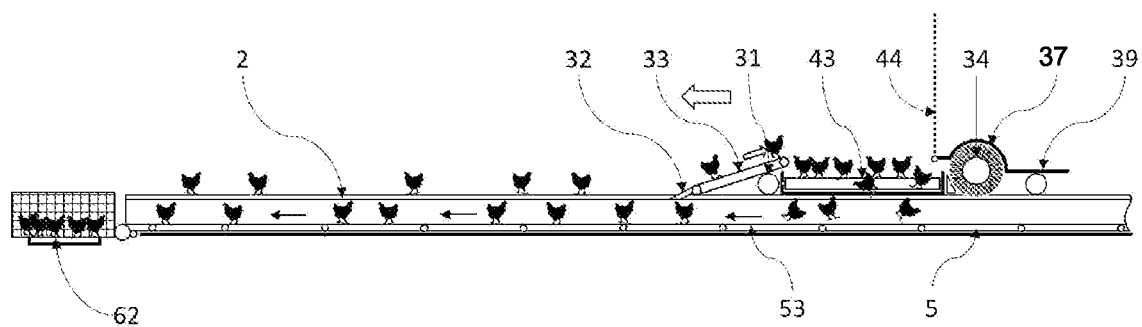
FIG. 15 is a diagram of bird harvesting, in accordance with various embodiments of the present disclosure.

FIG. 15 is a diagram of the matured birds collection in accordance with various embodiments of the automatic rearing system of the present disclosure. At the end of the rearing, the matured birds need to be collected and sent to the processing (slaughter) plant. Collecting live birds is a heavy task. In various embodiments, this is done automatically by the lateral conveyor 4 and longitudinal conveyor 5, incorporation with robot 3. The power-driven bird lifting device 33 sends the live bird to the lateral conveyor 4, at which time, mesh plate 44 above the lateral conveyor 4 has been artificially or automatically flipped. The live bird falls directly on the lateral conveyor belt 43 and is then delivered to the end. At this time the mesh cover plate 54 above the longitudinal conveyor belt 5 is also opened. The live birds delivered out of the lateral conveyor belt 4 falls directly on the longitudinal conveyor belt 53 and is transported to an outdoor collection point, which is manually or automatically loaded into a cages 62.

Figure 16:
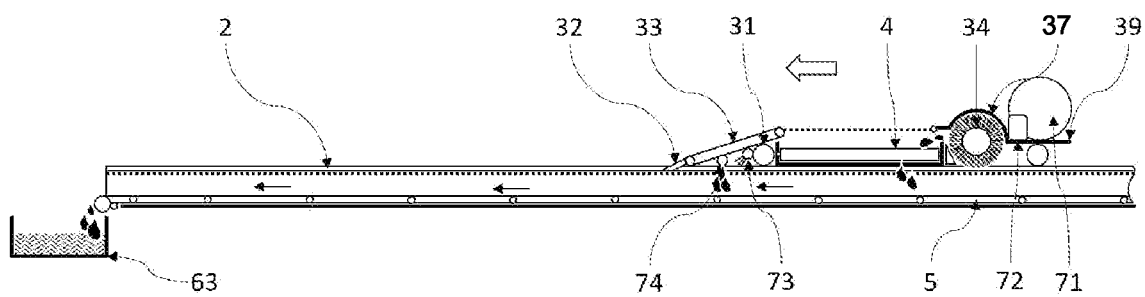
FIG. 16 is a diagram of cleaning and disinfecting operation of the robot, in accordance with various embodiments of the present disclosure.

FIG. 16 is the schematic show of the cleaning and disinfection components of the rearing system in accordance with various embodiments of the present disclosure.

At the end of the flock, all the birds have been removed from the shed. The rearing system is prepared for the cleaning and disinfection processing. Liquid container 71 can be permanently attached to the robot, or place on the rear platform of the robot, or placed on an independent trailer pulled by a robot. High-pressure nozzle 73 cleans floor panel surface and grooves 22. Wastewater after cleaning is collected by the suction pipe 74 and discharged into the longitudinal conveyor belt 53. At the same time, the rotating roller brush 34 further sends the residual water in groove 22 to the lateral conveyor belt via high-speed rotation. Both parts of wastewater are transported by longitudinal conveyors 5 to an outdoor sewage tank or processing facility 63. The tank can 71 be eliminated if an external water source is connected. Multiple tanks can be used, or one tank filled with water, disinfectant, or soaking chemicals for cleaning and disinfection purposes.

Figure 17:
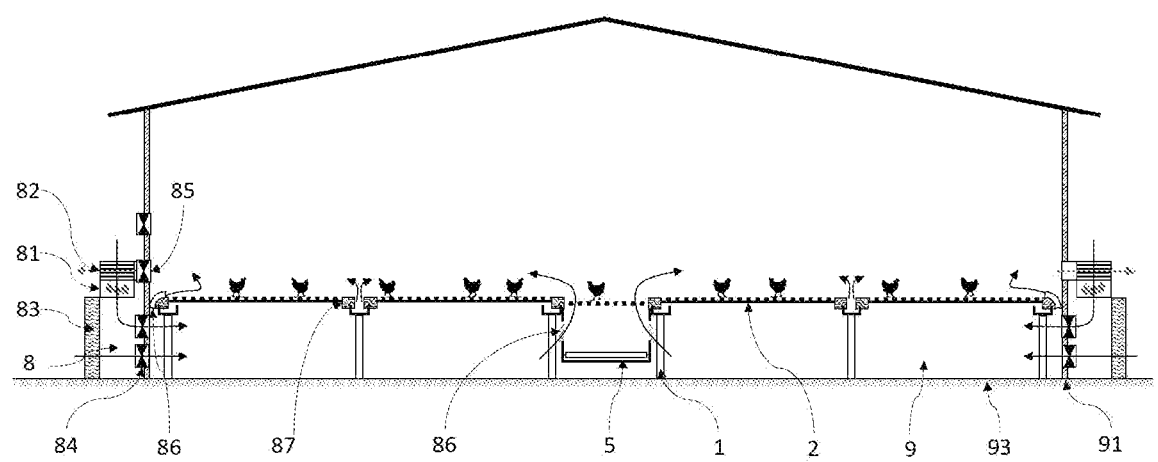
FIG. 17 is a diagram of the underfloor environmental control component of the rearing system, in accordance with various embodiments of the present disclosure.

FIG. 17 is a diagram of the underfloor environment control component in accordance with various embodiments of the rearing system of the present disclosure. The method of automatic rearing of livestock proposed by the present disclosure sets the suspended floor panel 2 above the ground 93, thus forming an enclosed space between floor panel 2 and ground 93. This enclosed space under the growing floor is used as an air distribution channel to benefit environment control of the upper floor growing space.

Referring to FIG. 17, the underfloor environment control components 8 and settings in different seasons are further described in detail as following. The floor panel 2 extended to the whole shed, divides the barn space into two separate parts: upper space where the birds are staying in and underneath space 9. The underfloor environmental control unit 8 includes air heating device 81, waste heat recovery device 82, air cooling device 83, inlet fan 84, exhaust fan 85, main air diffuser 86, and sub air diffuser 87. In various embodiments, the earth ground 93 can be covered with an insulation layer to reduce heat loss through the ground.

With the conventional summer cooling and ventilation, the first problem is that the main air stream flows across the barn at the highest above the birds (5-10 feet, in the center of the barn section). It is not best used to improve air quality near birds at the height of 0-10 inch). The second problem of the conventional tunnel ventilation is new fresh air travel hundreds of feet from one end to another end of the shed. Large fan power is used for air movement. Air at the end of affluence is very poor in comparison with fresh air at the entrance. In the summertime, the air at the entrance is cool and fresh, but is contaminated, humid, and hot at the effluence. Due to the difference of comfort at a different location, birds are tended to move toward the fresh and comfort end of the barn. To deal with this issue, birds crowd at one end and leave the other vacant, restraining fences are common to see in poultry shed. It cost labor time to place and remove fences, and birds are still piling up at near one fence toward the fresh air direction.

In the ventilation system proposed by the present disclosure, the outdoor fresh air first enters the space underneath the floor panels 2 and fills the underfloor space 9. The outdoor air could be un-conditioned fresh air or heated or cooled before entering the shed. It can be heated by the heating device 81, or cooled by cooler 83, or preheated by waste heat recover 82. Along the longitudinal conveyor 5 and the shed sidewall 91, there are major air inlet opening 86 to allow airflow from underfloor space to upper space. The minor air inlet 87 can be opened between two rows of floor panels. The major air inlet 86 and minor air inlet 87 are arranged across the whole growing floor thus ensuring that the fresh and comfortable air is evenly distributed throughout the field. Since the fresh air first passes through floor panel 2 and reach the birds, it ensures that the best comfort is provided to birds at the bird body height, instead of at high space or ceiling space. Each bird receives completely fresh air directly. Due to improved air movement and ventilation efficiency, the system requires less air amount in summer ventilation, and electric powers of fans can be reduced.

Air cooling device 83 can be a common evaporative water curtain, evaporation misting cooling system, water-air heat exchanger, and air conditioner (including water or ground source heat pumps). With the conventional winter heating, the problems are that warm air always rises above (bounce flow, or natural flow), resulting in the highest temperature near the roof or ceiling of she, but the air around the bird's body is relatively lower. Similarly, as the previous embodiment for summer cooling, the underfloor environmental control component of the present disclosure, using the air heating device 81 to the heated air to require temperature and the deliver it into the underfloor space 9 through the inlet fan 84. The heated air keeps the floor panel warm and provides conform to the birds on the floor panel 2. Warm air pass through the major air inlet 86 and minor air inlet 87, distributed to upper space to replace contaminated air, and maintain air quality at an acceptable level. Air heating device 81 can be a heater of any kind, including gas heaters, electric heaters, air sources or water sources, or ground-source heat pumps. Optionally, the energy used in the air heating unit 81 includes gas, liquefied gas, natural gas or other fuels, or biomass, geothermal or solar energy.

In various embodiments, before fresh air enters the air heating unit 81, it can be preheated by the waste heat recovery unit 82. Indoor warm exhaust air, by exhaust fan 85 introduced into the waste heat recovery device 82, transfer heat energy to the lower temperature of the fresh air. Waste air with reduced temperature is discharged to outdoors, and preheated fresh air then enters the air heating device 81 for further heating. The additional waste heat recovery unit 82 has proved to recover more than half of the waste heat, significantly reducing energy consumption during winter production.

In various embodiments of the automatic rearing system of the present disclosure, as described herein, offer an improved environment for animals growing on a clean panel without bedding material. The animal feces is removed, and the floor is cleaned by the robot system. The robot system is also used to replace labor on dead bird collection, bird harvesting, and barn cleaning and disinfection. Robot and attached sensors, with artificial intelligence, provide a health diagnosis, early warning, and medical treatment. The automatic rearing system reduces the contact of humans and animals for better biosecurity control. Invented underfloor environment control systems provide better comfort and improve air quality at reduced energy consumption.

In various embodiments, the automatic rearing system can be repeated in the horizontal direction, to result in a larger continuous growing space. The automatic rearing system can also be repeated vertically to form a multi-layer rearing structure. The upper space of the multiple-layer system can be the entire area of the shed plan or be a portion of the shed plan. As an example of a three-layer rearing system, each layer of rearing space from the bottom to the top can be 2400 square meters, 1800 square meters, 1200 square meters. It can be used to rear small birds, such as pigeons, chickens or slugs, etc.

The description herein is merely exemplary in nature and, thus, variations that do not depart from the gist of that which is described are intended to be within the scope of the teachings. Moreover, although the foregoing descriptions and the associated drawings describe example embodiments in the context of certain example combinations of elements and/or functions, it should be appreciated that different combinations of elements and/or functions can be provided by alternative embodiments without departing from the scope of the disclosure. Such variations and alternative combinations of elements and/or functions are not to be regarded as a departure from the spirit and scope of the teachings.

The invention claimed is:

1. An automatic rearing system for livestock growing, said rearing system comprising:
   a supporting frame;
   at least one floor panel placed on the frame, the at least one panel including grooves on the top surface wherein the size of the grooves is smaller than a footpad of livestock housed within the system, and wherein the at least one floor panels is structured and operable to retain feces and debris on a top surface thereof,
   an operating robot structured and operable to move on the top surface of the floor panel, the operating robot comprising:
      a battery or electric plug;
      a plurality wheels for moving on the at least one floor panel;
      a driven motor; and
      a robot conveyor one of perpendicular to or at a first preset angle to the moving direction of the robot;
   a system lateral conveyor; and
   a longitudinal conveyor, wherein the lateral conveyor is attached to the operating robot, with one end near the longitudinal conveyor, and the longitudinal conveyor is set at a first preset angle with the lateral conveyor;
   a shed in which the supporting frame, the at least one floor panel, the robot, the lateral conveyor and the longitudinal conveyor are housed; and
   a mesh plate disposed over the lateral conveyor, wherein the size of openings in the mesh is smaller than a footpad of the animal housed within the system and allows feces and debris to pass therethrough, and wherein the mesh plate has a hinge so to be pivotal along a long edge of the mesh plate.

2. The system of claim 1, wherein the floor panel grooves are arched grooves.

3. The system of claim 1 wherein the grooves are structured and operable to form a 180 degree of turning radius for the robot to move along.

4. The system of claim 1, wherein the robot further comprises a plurality of tooth shovels with a tooth pitch and width fitting with the grooves of at least one floor panel.

5. The system of claim 1, wherein the robot further comprises a rotary roller brush, a length direction of the rotary roller brush and the moving direction of the robot being set to a second angle, and the bottom of the rotary brush being close to the edge of the lateral conveyor.

6. The system of claim 1, wherein the robot further comprises an animal lifting device comprising one of a drum-driven conveyor belt or a reciprocating eccentric device.

7. The system of claim 5, wherein the robot further comprises a dust suction and vacuum device having a suction inlet that is close to the rotary brush.

8. The system of claim 1, wherein the robot further comprises a platform.

9. The system of claim 1, wherein the robot further comprises a cleaning device with a liquid or powder tank, water pipe, and a plurality of nozzles installed along the length of the water pipe.

10. The system of claim 1, wherein the robot further comprises at least one health diagnostic sensors comprising at least one of an infrared temperature sensor and visual image sensor.

11. The system of claim 1, wherein the mesh plate is disposed above the lateral conveyor, and comprises a plurality of shutters which can be flipped along a shaft to allow feces to fall to the lateral conveyor belt.

12. The system of claim 1, wherein the longitudinal conveyors are housed in a U-type enclosure and are structured and operable to hold feces and wastewater without leakage to an underfloor space.

13. The system of claim 1, further comprising an underfloor environmental control component that delivers one of conditioned fresh air, unconditioned fresh air into an underfloor space enclosed by the at least one floor panel, a plurality of sidewalls, and ground floor.

14. The system of claim 13, wherein the underfloor environmental control component comprising a major air outlet along a sidewall of the shed of the system and along a sidewall of the longitudinal conveyor, and a minor air inlet set in a junction between two-floor panels.

15. The system of claim 14, wherein the underfloor environmental control component further comprises:
heating devices with heaters;
cooling and ventilation devices; and
waste heat recovery device for preheating of fresh air.

16. The system of claim 1, wherein the shed is divided into multiple rearing zones.

17. The system of claim 1, further comprising a vertically repeated system that forms a multi-layer rearing space, wherein an upper rearing space is one of an entire area of the shed or a part of the shed area.

* * * * *